(12) United States Patent
Peng et al.

(10) Patent No.: US 11,257,497 B2
(45) Date of Patent: Feb. 22, 2022

(54) VOICE WAKE-UP PROCESSING METHOD, APPARATUS AND STORAGE MEDIUM

(71) Applicant: BAIDU ONLINE NETWORK TECHNOLOGY (BEIJING) CO., LTD., Beijing (CN)

(72) Inventors: Hanying Peng, Beijing (CN); Nengjun Ouyang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 67 days.

(21) Appl. No.: 16/725,702

(22) Filed: Dec. 23, 2019

(65) Prior Publication Data
US 2020/0202857 A1  Jun. 25, 2020

(30) Foreign Application Priority Data
Dec. 25, 2018 (CN) .......................... 201811590014.8

(51) Int. Cl.
*G10L 15/22* (2006.01)
*G10L 25/87* (2013.01)
(Continued)

(52) U.S. Cl.
CPC .............. *G10L 15/22* (2013.01); *G10L 15/06* (2013.01); *G10L 15/20* (2013.01); *G10L 15/28* (2013.01); *G10L 25/87* (2013.01)

(58) Field of Classification Search
CPC ......... G10L 15/22; G10L 15/20; G10L 15/06; G10L 15/28; G10L 25/87
(Continued)

(56) References Cited

U.S. PATENT DOCUMENTS

| 8,990,079 B1 * | 3/2015 | Newman ................. G10L 25/93 704/233 |
| 9,277,322 B2 * | 3/2016 | Bech ......................... H04S 7/30 |

(Continued)

FOREIGN PATENT DOCUMENTS

| CN | 102819009 A | 12/2012 |
| CN | 103678456 A | 3/2014 |

(Continued)

OTHER PUBLICATIONS

S. M. Kuo, H. Chuang and P. P. Mallela, "Integrated automotive signal processing and audio system," in IEEE Transactions on Consumer Electronics, vol. 39, No. 3, pp. 522-532, Aug. 1993, doi: 10.1109/30.234630. (Year: 1993).*

(Continued)

*Primary Examiner* — Bharatkumar S Shah
(74) *Attorney, Agent, or Firm* — J.C Patents

(57) ABSTRACT

The present disclosure provides a voice wake-up processing method, an apparatus and a storage medium. After acquiring voice wake-up signals collected by audio input devices in at least two audio zones, an electronic device may correct, based on to-be-woken-up audio zones obtained from amplitudes of the voice wake-up signals collected by the audio input devices in the at least two audio zones, a to-be-woken-up audio zone identified using a voice engine, avoiding that audio zones in which a plurality of audio input devices collecting voice wake-up signals produced from a same user are located are all woken up, therefore, it is possible to improve accuracy of a voice wake-up result obtained by the electronic device. Therefore, the present disclosure can solve the technical problem that a vehicle-mounted terminal has low voice wake-up accuracy due to an insufficient degree of sound isolation between audio zones of the vehicle-mounted terminal.

20 Claims, 7 Drawing Sheets

(51) Int. Cl.
*G10L 15/20* (2006.01)
*G10L 15/28* (2013.01)
*G10L 15/06* (2013.01)

(58) Field of Classification Search
USPC ........................................................ 704/275
See application file for complete search history.

(56) References Cited

U.S. PATENT DOCUMENTS

| 2016/0039356 | A1 | 2/2016 | Talwar |
| 2018/0190282 | A1 | 7/2018 | Mohammad |
| 2019/0237067 | A1* | 8/2019 | Friedman ................. G10L 15/22 |

FOREIGN PATENT DOCUMENTS

| CN | 106254612 A | 12/2016 |
| CN | 106653041 A | 5/2017 |
| CN | 107277699 A | 10/2017 |
| CN | 107465986 A | 12/2017 |
| CN | 107533842 A | 1/2018 |
| CN | 107622767 A | 1/2018 |
| CN | 107636745 A | 1/2018 |
| CN | 108899044 A | 11/2018 |
| CN | 108922528 A | 11/2018 |
| DE | 102016212647 A1 | 6/2017 |
| EP | 2352159 A1 * | 8/2011 ......... G07F 19/2055 |
| EP | 2353159 A1 * | 8/2011 ............. G10L 25/48 |
| WO | WO2017138934 A1 | 8/2017 |

OTHER PUBLICATIONS

S. M. Kuo, H. Chuang and P. P. Mallela, "Integrated automotive signal processing and audio system," in IEEE Transactions on Consumer Electronics, vol. 39, No. 3, pp. 522-532, Aug. 1993, doi: 10.1109/30.234630. (Year: 1993) (Year: 1993).*
S. P. Gadde et al., "A quantitative real time data analysis in vehicular speech environment with varying SNR," 2016 IEEE 18th International Workshop on Multimedia Signal Processing (MMSP), 2016, pp. 1-6, doi: 10.1109/MMSP.2016.7813375. (Year: 2016).*
The NOA of priority CN application.
NPL1: "Real-Time Multiple Sound Source Localization and Counting Using a Circular Microphone Array", IEEE Transactions on Audio, Speech, and Language Processing, vol. 21, No. 10, Oct. 2013.
NPL2: "Speech-picking for speech systems with auditory attention ability", Information Science, vol. 45, No. 10, (2015), pp. 1310-1327, 2015.
The first Office Action of the priority CN application.

* cited by examiner

VOICE WAKE-UP PROCESSING METHOD, APPARATUS AND STORAGE MEDIUM

CROSS-REFERENCE TO RELATED APPLICATIONS

This application claims priority to Chinese Patent Application No. 201811590014.8, filed on Dec. 25, 2018, which is hereby incorporated by reference in its entirety.

TECHNICAL FIELD

The present disclosure relates to the field of intelligent device technologies and, in particular, to a voice wake-up processing method, an apparatus, and a storage medium.

BACKGROUND

A vehicle-mounted terminal may interact with a user over voice so that the user is provided with services such as navigation, music playing, phone calling and the like. A microphone of the existing vehicle-mounted terminal is designed to be aligned with a driver seat, and may provide a voice service for the driver of the vehicle. Such design mode makes it impossible for the vehicle-mounted terminal to provide services to other members on the vehicle.

At present, a vehicle-mounted four-audio-zone scheme that can satisfy the use by all members on the vehicle is introduced. In this scheme, the space inside the vehicle is divided into four audio zones, including front, rear, left and right audio zones, each of which covers a position in the vehicle. The vehicle-mounted terminal is provided with an independent microphone array in each audio zone, which may perform voice interaction with a user at a corresponding position of the audio zone. Specifically, the microphone array provided in each audio zone may collect a voice signal produced from the user at the corresponding position of the audio zone. A voice engine of the vehicle-mounted terminal may identify, according to the voice signal collected by the microphone array in each audio zone, which audio zone is woken up by the user, and process and respond to a voice signal subsequently collected by the microphone array in the woken-up audio zone.

However, due to a small space inside the vehicle, although a certain degree of audio isolation may be created for the four positions through a microphone array module algorithm, a part of voice signals will be collected by microphone arrays in other audio zones when a user at any position is waking up the vehicle-mounted terminal over voice, thereby affecting voice wake-up accuracy of the vehicle-mounted terminal.

SUMMARY

The present disclosure provides a voice wake-up processing method, an apparatus, and a storage medium for solving the technical problem that a vehicle-mounted terminal has low voice wake-up accuracy due to an insufficient degree of sound isolation between audio zones of the vehicle-mounted terminal.

In a first aspect of the present disclosure, a voice wake-up processing method applied to an electronic device is provided, where the electronic device includes an audio input device provided in each audio zone, and the method includes:

acquiring voice wake-up signals collected by audio input devices in at least two audio zones;

determining, according to amplitudes of the voice wake-up signals collected by the audio input devices in the at least two audio zones, a first set of to-be-woken-up audio zones, where a voice wake-up signal collected by an audio input device in an audio zone of the first set of to-be-woken-up audio zones has an amplitude greater than or equal to a preset amplitude;

determining, according to the voice wake-up signals collected by the audio input devices in the at least two audio zones, a second set of to-be-woken-up audio zones using a voice engine; and if the first set of to-be-woken-up audio zones and the second set of to-be-woken-up audio zones have an identical audio zone, using the identical audio zone as a woken-up audio zone of the electronic device.

Optionally, the method further includes:

if the first set of to-be-woken-up audio zones and the second set of to-be-woken-up audio zones do not have an identical audio zone, using an audio zone of the first set of to-be-woken-up audio zones as a woken-up audio zone of the electronic device.

Optionally, the determining, according to amplitudes of the voice wake-up signals collected by the audio input devices in the at least two audio zones, a first set of to-be-woken-up audio zones includes:

determining whether a maximum amplitude from the amplitudes of the voice wake-up signals collected by the audio input devices in the at least two audio zones is greater than or equal to the preset amplitude;

if the maximum amplitude is greater than or equal to the preset amplitude, adding an identifier of a first audio zone in which an audio input device corresponding to the maximum amplitude is located to the first set of to-be-woken-up audio zones;

updating, according to a degree of sound isolation between the first audio zone and each second audio zone of second audio zones, an amplitude of a voice wake-up signal collected by an audio input device in each second audio zone, where the second audio zone is an audio zone in the at least two audio zones other than the first audio zone;

determining, from updated amplitudes of voice wake-up signals collected by audio input devices in the second audio zones, whether there is an amplitude greater than or equal to the preset amplitude; and if from the updated amplitudes of the voice wake-up signals collected by the audio input devices in the second audio zones there is an amplitude greater than or equal to the preset amplitude, adding an identifier of a second audio zone in which an audio input device corresponding to the amplitude greater than or equal to the preset amplitude is located to the first set of to-be-woken-up audio zones.

Optionally, the acquiring voice wake-up signals collected by audio input devices in at least two audio zones includes:

acquiring voice signals collected by the audio input devices in the at least two audio zones; and determining, according to a preset wake-up word, the voice signals collected by the audio input devices in the at least two audio zones as the voice wake-up signals.

Optionally, after the using the identical audio zone as a woken-up audio zone of the electronic device, the method further includes:

performing semantic identification and processing on a voice signal subsequently collected by an audio input device in the woken-up audio zone of the electronic device.

Optionally, the electronic device is a vehicle-mounted terminal.

Optionally, one audio zone covers one seat of the vehicle.

In a second aspect of the present disclosure, a voice wake-up processing apparatus applied to an electronic device is provided, where the electronic device includes an audio input device provided in each audio zone, and the apparatus includes:

an acquiring module, configured to acquire voice wake-up signals collected by audio input devices in at least two audio zones;

a first processing module, configured to determine, according to amplitudes of the voice wake-up signals collected by the audio input devices in the at least two audio zones, a first set of to-be-woken-up audio zones, where a voice wake-up signal collected by an audio input device in an audio zone of the first set of to-be-woken-up audio zones has an amplitude greater than or equal to a preset amplitude;

a second processing module, configured to determine, according to the voice wake-up signals collected by the audio input devices in the at least two audio zones, a second set of to-be-woken-up audio zones using a voice engine; and a waking-up module, configured to use, when the first set of to-be-woken-up audio zones and the second set of to-be-woken-up audio zones have an identical audio zone, the identical audio zone as a woken-up audio zone of the electronic device.

Optionally, the waking-up module is further configured to use, when the first set of to-be-woken-up audio zones and the second set of to-be-woken-up audio zones do not have an identical audio zone, an audio zone of the first set of to-be-woken-up audio zones as a woken-up audio zone of the electronic device.

Optionally, the first processing module includes:

a first determining unit, configured to determine whether a maximum amplitude from the amplitudes of the voice wake-up signals collected by the audio input devices in the at least two audio zones is greater than or equal to the preset amplitude;

a first adding unit, configured to add, when the maximum amplitude from the amplitudes of the voice wake-up signals collected by the audio input devices in the at least two audio zones is greater than or equal to the preset amplitude, an identifier of a first audio zone in which an audio input device corresponding to the maximum amplitude is located to the first set of to-be-woken-up audio zones;

an updating unit, configured to update, according to a degree of sound isolation between the first audio zone and each second audio zone of second audio zones, an amplitude of a voice wake-up signal collected by an audio input device in each second audio zone, where the second audio zone is an audio zone in the at least two audio zones other than the first audio zone;

a second determining unit, configured to determine, from updated amplitudes of voice wake-up signals collected by audio input devices in the second audio zones, whether there is an amplitude greater than or equal to the preset amplitude; and a second adding unit, configured to add, when from the updated amplitudes of the voice wake-up signals collected by the audio input devices in the second audio zones there is an amplitude greater than or equal to the preset amplitude, an identifier of a second audio zone in which an audio input device corresponding to the amplitude greater than or equal to the preset amplitude is located to the first set of to-be-woken-up audio zones.

Optionally, the acquiring module is specifically configured to: acquire voice signals collected by the audio input devices in the at least two audio zones; and determine, according to a preset wake-up word, the voice signals collected by the audio input devices in the at least two audio zones as the voice wake-up signals.

Optionally, the apparatus further includes:

a third processing module, configured to perform, after the waking-up module uses the identical audio zone as the woken-up audio zone of the electronic device, semantic identification and processing on a voice signal subsequently collected by an audio input device in the woken-up audio zone of the electronic device.

Optionally, the electronic device is a vehicle-mounted terminal.

Optionally, one audio zone covers one seat of the vehicle.

In a third aspect of the present disclosure, a voice wake-up processing apparatus is provided, including: at least one processor and a memory;

where the memory stores a computer executable instruction; and the at least one processor executes the computer executable instruction stored in the memory such that the voice wake-up processing apparatus performs the voice wake-up processing method described above.

In a fourth aspect of the present disclosure, a computer readable storage medium having a computer executable instruction stored thereon is provided, where the computer executable instruction implements the voice wake-up processing method described above when executed by a processor.

According to the voice wake-up processing method, the apparatus and the storage medium provided in the present disclosure, for an electronic device having an insufficient degree of sound isolation between audio zones, after acquiring voice wake-up signals collected by audio input devices in at least two audio zones, the electronic device may correct, based on to-be-woken-up audio zones obtained from amplitudes of the voice wake-up signals collected by the audio input devices in the at least two audio zones, a to-be-woken-up audio zone identified using a voice engine, avoiding that audio zones in which a plurality of audio input devices collecting voice wake-up signals produced from a same user are located are all woken up, therefore, it is possible to improve accuracy of a voice wake-up result obtained by the electronic device.

DESCRIPTION OF EMBODIMENTS

In order to illustrate objectives, technical solutions, and advantages of the present disclosure more clearly, the technical solutions in the embodiments of the present disclosure will be described hereunder clearly and comprehensively with reference to the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the scope of the present disclosure.

Figure 1:
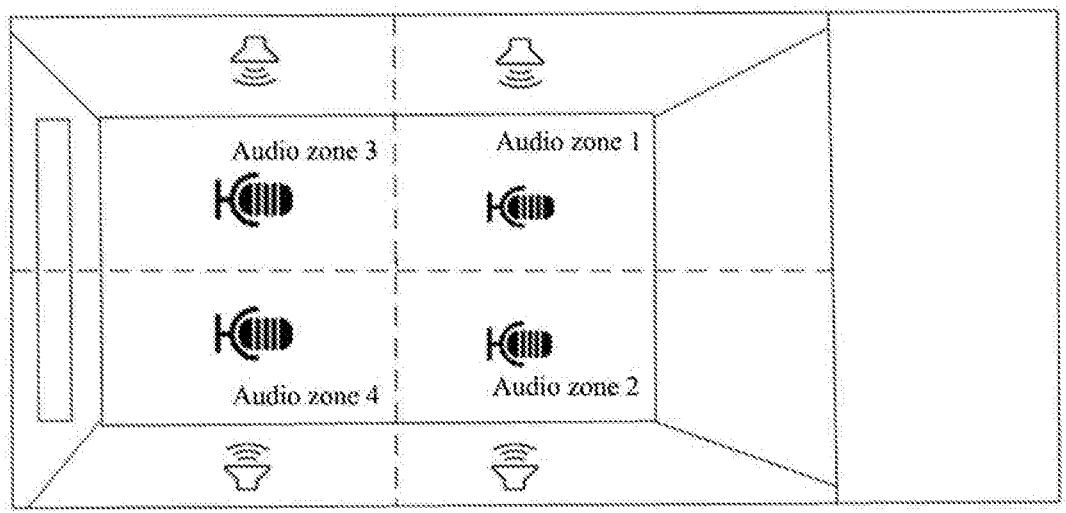
FIG. 1 is a schematic diagram of an application scenario of a vehicle-mounted terminal according to the present disclosure.

FIG. 1 is a schematic diagram of an application scenario of a vehicle-mounted terminal according to the present disclosure. As shown in FIG. 1, in order to satisfy the use of the vehicle-mounted terminal by all members on a vehicle, currently a vehicle-mounted four-audio-zone scheme is introduced. In this scheme, the space inside the vehicle is divided into four audio zones, each of which covers a position in the vehicle, and each of which is provided with an independent microphone array capable of collecting a voice signal from a user at a corresponding position of the audio zone. The microphone array can be provided at any position convenient for collecting the user's voice signal, such as at an upper roof of a corresponding position of the audio zone.

For example, an audio zone 1 covers a driver seat position of the vehicle, and a microphone array of the audio zone 1 is used to collect a voice signal produced from a user at the driver seat position of the vehicle; an audio zone 2 covers a front passenger seat position of the vehicle, and a microphone array of the audio zone 2 is used to collect a voice signal produced from a user at the front passenger seat position of the vehicle; an audio zone 3 includes a position on the left of the rear row of the vehicle, and a microphone array of the audio zone 3 is used to collect a voice signal produced from a user at the position on the left of the rear row of the vehicle; an audio zone 4 includes a position on the right of the rear row of the vehicle, and a microphone array of the audio zone 4 is used to collect a voice signal produced from a user at the position on the right of the rear row of the vehicle.

It will be appreciated that, for convenience of giving an example, FIG. 1 only shows positions of microphone arrays of a vehicle-mounted terminal, while configuration of the vehicle-mounted terminal, the position of the vehicle-mounted terminal in the vehicle, and the positions of the microphone arrays are not limited in the present disclosure.

Correspondingly, a voice engine of the vehicle-mounted terminal may identify, according to the voice signal collected by the microphone array in each audio zone, which audio zone is woken up by the user, and process and respond to a voice signal subsequently collected by the microphone array in the woken-up audio zone. In this way, the vehicle-mounted terminal may also be allowed to provide voice services to members at other positions of the vehicle, and is no longer limited to providing voice services only to the driver of the vehicle.

However, due to a small space inside the vehicle, although a certain degree of audio isolation may be created for the four positions through a microphone array module algorithm, a part of voice signals will be collected by microphone arrays in other audio zones when a user at any position is waking up the vehicle-mounted terminal over voice, thereby affecting voice wake-up accuracy of the vehicle-mounted terminal. For example, when the user at the audio zone 1 inputs a voice wake-up signal over voice, the microphone array at the audio zone 1, the microphone array at the audio zone 2, and the microphone array at the audio zone 3 may be all allowed to collect the voice wake-up signal input by the user over voice so that the voice engine of the vehicle-mounted terminal misidentifies that the audio zone 1, the audio zone 2, and the audio zone 3 are all woken up, causing the audio zone 1, the audio zone 2, and the audio zone 3 of the vehicle-mounted terminal to simultaneously respond to the user, and user experience being poor.

In view of the above problem, the present disclosure provides a voice wake-up processing method for solving the technical problem that a vehicle-mounted terminal has low voice wake-up accuracy due to an insufficient degree of sound isolation between audio zones of the vehicle-mounted terminal.

It will be appreciated that the voice wake-up processing method provided in the present disclosure can be applied to any electronic device that can provide voice services for users at multiple audio zones, such as a vehicle-mounted terminal, an intelligent home system, and the like. Illustratively, when the electronic device is the vehicle-mounted terminal, one audio zone as described above can cover one position on the vehicle. When the electronic device is the intelligent home system, one audio zone as described above can correspond to an area of the space where the intelligent home system is located, and so on.

The technical solutions of the present disclosure will be described hereunder in detail with reference to specific embodiments. The following specific embodiments may be combined with each other, and the same or similar concepts or processes may not be repeated in some embodiments.

Figure 2:
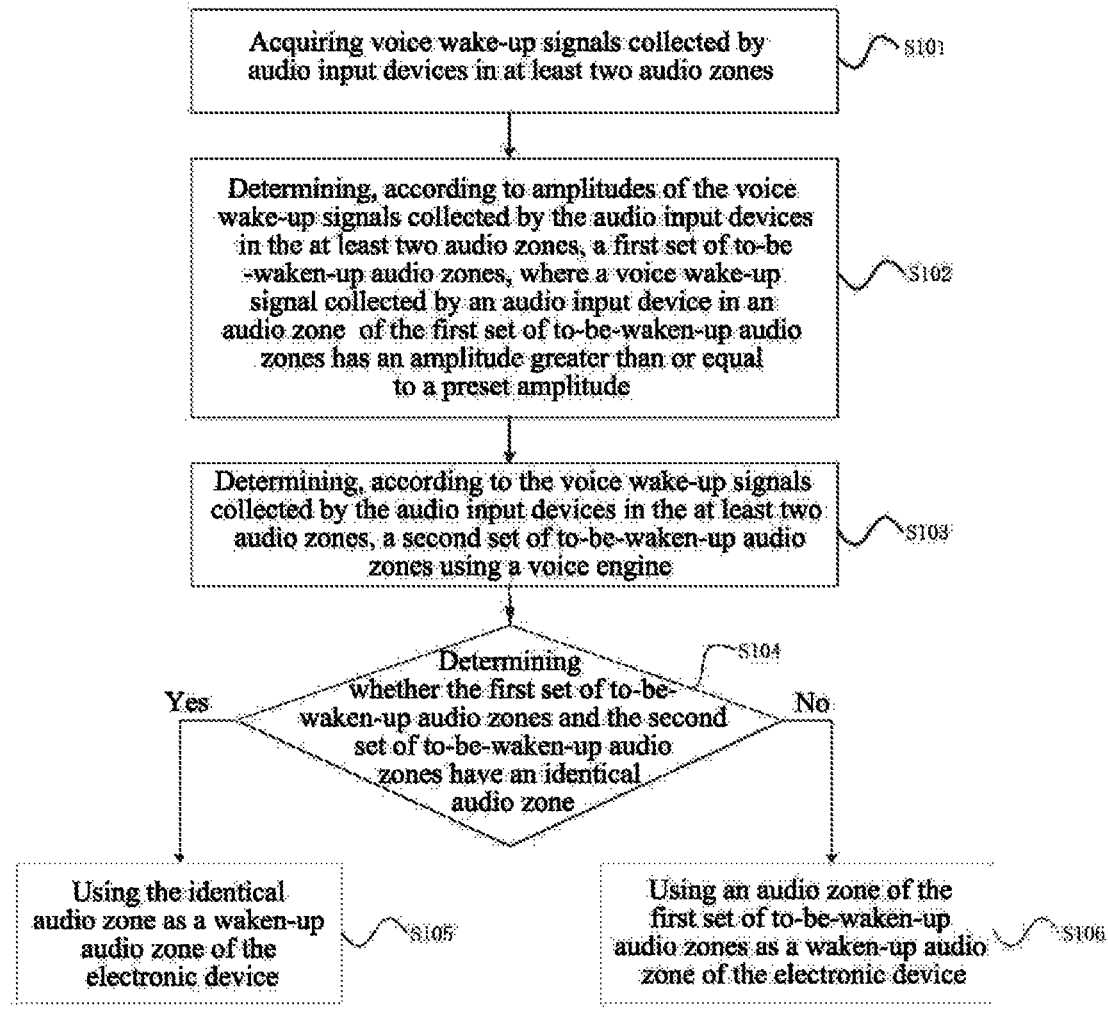
FIG. 2 is a schematic flowchart of a voice wake-up processing method according to the present disclosure.

FIG. 2 is a schematic flowchart of a voice wake-up processing method according to the present disclosure. An executive subject of the present disclosure may be a voice wake-up apparatus, or an electronic device integrated with the voice wake-up apparatus. The voice wake-up processing method provided in the present disclosure will be described and introduced hereunder by taking the electronic device integrated with the voice wake-up apparatus (called the electronic device for short) as an example. In this embodiment, the electronic device includes an audio input device provided at each audio zone. The audio input device mentioned herein may be any device with an audio collection function, such as a microphone array.

As shown in FIG. 2, the method may include:

S101: acquiring voice wake-up signals collected by audio input devices in at least two audio zones.

It will be appreciated that the voice wake-up signals collected by the audio input devices in the at least two audio zones may be a voice wake-up signal produced from a same user, or voice wake-up signals produced from users in different audio zones. Taking an audio input device in an audio zone A and an audio input device in an audio zone B as an example, a voice wake-up signal collected by the audio input device in the audio zone A and a voice wake-up signal collected by the audio input device in the audio zone B may be a voice wake-up signal from a same user; alternatively, the voice wake-up signal collected by the audio input device in the audio zone A is a voice wake-up signal produced from a user in the audio zone A, and the voice wake-up signal collected by the audio input device in the audio zone B is a voice wake-up signal produced from a user in the audio zone B.

This embodiment does not limit a manner in which the electronic device acquires the voice wake-up signals collected by the audio input devices in the at least two audio zones. For example, the electronic device may acquire voice signals collected by the audio input devices in the at least two audio zones, and determine, according to a preset wake-up word, whether the voice signals collected by the audio input devices in the at least two audio zones are the voice wake-up signals. For example, when the voice signals collected by the audio input devices in the at least two audio zones carry the preset wake-up word, it is determined that the voice signals collected by the audio input devices in the at least two audio zones are the voice wake-up signals, and the electronic device may further perform a subsequent operation. When the voice signals collected by the audio input devices in the at least two audio zones do not carry the preset wake-up word, the electronic device may end this process.

S102: determining, according to amplitudes of the voice wake-up signals collected by the audio input devices in the at least two audio zones, a first set of to-be-woken-up audio zones, where a voice wake-up signal collected by an audio input device in an audio zone of the first set of to-be-woken-up audio zones has an amplitude greater than or equal to a preset amplitude.

The closer the user who produces a voice wake-up signal to an audio input device, the larger an amplitude of the voice wake-up signal collected by the audio input device. That is to say, the larger the amplitude, the closer the user to the audio input device, and the higher probability the user has to wake up an audio zone where the audio input device is located. The smaller the amplitude, the further the user to the audio input device, and the lower probability the user has to wake up an audio zone where the audio input device is located.

Therefore, the electronic device may compare the amplitude of the voice wake-up signal collected by the audio input device in each audio zone with a preset amplitude to distinguish which audio zones are woken up by users. A value of the described preset amplitude may be determined according to a maximum amplitude among voice wake-up signals that can be collected by audio input devices in all audio zones. For example, the preset amplitude may be equal to the maximum amplitude among the voice wake-up signals that can be collected by the audio input devices in all the audio zones, or the preset amplitude may be slightly smaller than the maximum amplitude among the voice wake-up signals that can be collected by the audio input devices in all the audio zones. Illustratively, taking the electronic device being the vehicle-mounted terminal as an example, the preset amplitude may be 2,000.

If a voice wake-up signal collected by an audio input device in a certain audio zone has an amplitude greater than or equal to the preset amplitude, it indicates that the voice wake-up signal collected by the audio input device in the audio zone is produced from a user in the audio zone. That is, the user in the audio zone is waking up the audio zone. Then, the electronic device may use the audio zone as a to-be-woken-up audio zone, and add an identifier of the audio zone to the first set of to-be-woken-up audio zones. That is, audio zones included in the first set of to-be-woken-up audio zones are to-be-woken-up audio zones determined according to the amplitudes of the voice wake-up signals collected by the audio input devices in the audio zones. It can be understood that the identifier of the audio zone involved in the present disclosure may be any identifier that can uniquely identify the audio zone such as an index number of the audio zone or location information of the audio zone, which is not limited in the present disclosure.

S103: determining, according to the voice wake-up signals collected by the audio input devices in the at least two audio zones, a second set of to-be-woken-up audio zones using a voice engine.

Specifically, the electronic device may further identify the voice wake-up signals collected by the audio input devices in the at least two audio zones by a voice engine to see which audio zones are woken up by users, and to use a set of identifiers of these audio zones as a second set of to-be-woken-up audio zones. That is, audio zones included in the second set of to-be-woken-up audio zones are to-be-woken-up audio zones determined by the voice engine.

With regard to how the electronic device determines, according to the voice wake-up signals collected by the audio input devices in the audio zones, the to-be-woken-up audio zones using the voice engine, reference may be made to the prior art, for which details will not be described herein again.

S104: determining whether the first set of to-be-woken-up audio zones and the second set of to-be-woken-up audio zones have an identical audio zone. If yes, S105 is performed; if no, S106 is performed.

S105: using the identical audio zone as a woken-up audio zone of the electronic device.

S106: using an audio zone of the first set of to-be-woken-up audio zones as a woken-up audio zone of the electronic device.

After acquiring the first set of to-be-woken-up audio zones and the second set of to-be-woken-up audio zones, the electronic device may compare the first set of to-be-woken-up audio zones with the second set of to-be-woken-up audio zones to determine whether the two sets of to-be-woken-up zones have an identical audio zone (i.e. whether there is an intersection). If there is an identical audio zone, it is determined that the identical audio zone is woken up by a user, and the identical audio zone is used as a woken-up audio zone of the electronic device. Further, if the first set of to-be-woken-up audio zones and the second set of to-be-woken-up audio zones do not have an identical audio zone, an audio zone of the first set of to-be-woken-up audio zones is used directly as a woken-up audio zone of the electronic device.

When the electronic device is in a scenario where a degree of sound isolation between a plurality of audio zones is less than or equal to a preset degree of isolation, audio input devices provided by the electronic device in the plurality of audio zones may collect a voice signal from a same sound source. That is to say, the voice wake-up signals collected by the audio input devices provided in the plurality of audio zones may be a voice wake-up signal from a same user. The preset degree threshold of isolation mentioned herein may be determined according to the degree of sound isolation between the audio zones.

Since an amplitude of a voice wake-up signal may reflect a distance of a user away from an audio input device in each audio zone, the electronic device may more accurately determine which audio zone is woken up based on the amplitude of the voice wake-up signal. Further, by using the to-be-woken-up audio zone obtained based on the amplitude of the voice wake-up signal to correct a to-be-woken-up audio zone identified by the electronic device based on the voice engine, accuracy of a voice wake-up result obtained by the electronic device may be improved.

Further, after determining the woken-up audio zone of the electronic device, the electronic device may perform semantic identification and processing on a voice signal subsequently collected by an audio input device in the woken-up audio zone of the electronic device so that a voice interaction with a user in this audio zone is performed to provide the user in this audio zone with a voice service.

With continued reference to FIG. 1, taking the electronic device being the vehicle-mounted terminal as an example, since there is an insufficient degree of sound isolation between audio zones, when a user in the audio zone 1 is inputting a voice wake-up signal over voice, an audio input device in the audio zone 1, an audio input device in the audio zone 2 and an audio input device in the audio zone 3 all collect the voice wake-up signal input by the user over voice.

Then, the vehicle-mounted terminal may obtain a first set of to-be-woken-up audio zones according to an amplitude of the voice wake-up signal collected by the audio input device in the audio zone 1, an amplitude of the voice wake-up signal collected by the audio input device in the audio zone 2, and an amplitude of the voice wake-up signal collected by the audio input device in the audio zone 3. Assuming that the amplitude of the voice wake-up signal collected by the audio input device in the audio zone 1 is greater than or equal to the preset amplitude, the first set of to-be-woken-up audio zones includes: an identifier of the audio zone 1.

Simultaneously, the vehicle-mounted terminal may use a voice engine to obtain a second set of to-be-woken-up audio zones according to the voice wake-up signal collected by the audio input device in the audio zone 1, the voice wake-up signal collected by the audio input device in the audio zone 2, and the voice wake-up signal collected by the audio input device in the audio zone 3. It is assumed that the second set of to-be-woken-up audio zones includes: an identifier of the audio zone 1, an identifier of the audio zone 2, and an identifier of the audio zone 3.

In this example, the first set of to-be-woken-up audio zones and the second set of to-be-woken-up audio zones have an identical audio zone and the identical audio zone is the audio zone 1, thus the electronic device may use the audio zone 1 as a woken-up audio zone of the electronic device. Compared with the situation where the electronic device uses the to-be-woken-up audio zone identified by the voice engine as a woken-up audio zone, the method in this embodiment may improve accuracy of a voice wake-up result obtained by a vehicle-mounted terminal, and avoid the technical problem that the vehicle-mounted terminal has low voice wake-up accuracy due to an insufficient degree of sound isolation between audio zones of the vehicle-mounted terminal.

According to the voice wake-up processing method provided in the present disclosure, for an electronic device having an insufficient degree of sound isolation between audio zones, after acquiring voice wake-up signals collected by audio input devices in at least two audio zones, the electronic device may correct, based on to-be-woken-up audio zones obtained from amplitudes of the voice wake-up signals collected by the audio input devices in the at least two audio zones, a to-be-woken-up audio zone identified using a voice engine, avoiding that audio zones in which a plurality of audio input devices collecting voice wake-up signals produced from a same user are located are all woken up, therefore, it is possible to improve accuracy of a voice wake-up result obtained by the electronic device.

Figure 3:
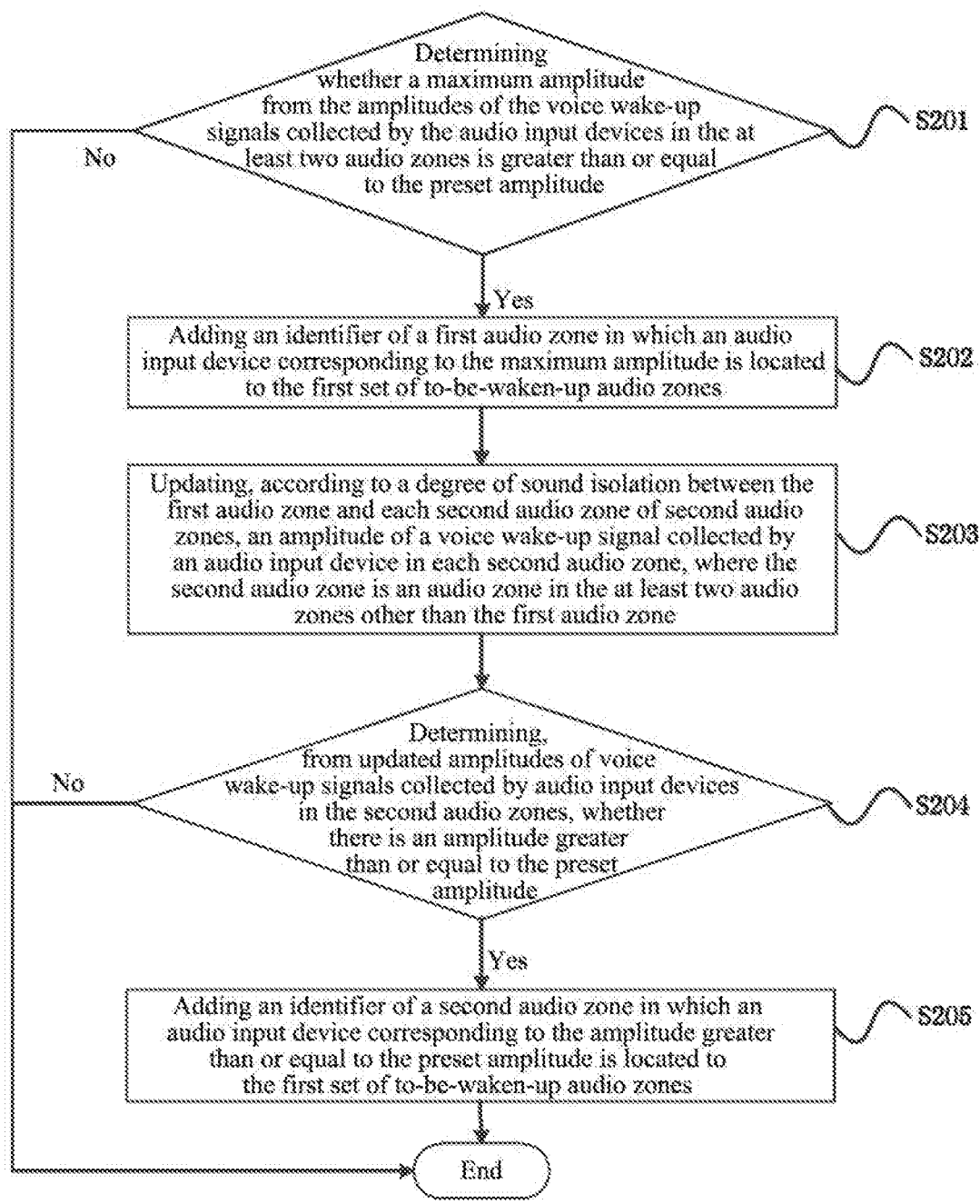
FIG. 3 is a schematic flowchart of another voice wake-up processing method according to the present disclosure.

FIG. 3 is a schematic flowchart of another voice wake-up processing method according to the present disclosure. As shown in FIG. 3, based on the foregoing embodiment, the step S102 as described above may include the following steps:

S201: determining whether a maximum amplitude from the amplitudes of the voice wake-up signals collected by the audio input devices in the at least two audio zones is greater than or equal to the preset amplitude. If yes, S202 is performed; if no, this process is ended.

It is possible to distinguish which audio zone is woken by determining whether a maximum amplitude from the amplitudes of the voice wake-up signals collected by the audio input devices in the at least two audio zones is greater than or equal to the preset amplitude.

With continued reference to FIG. 1, taking the electronic device as an example of a vehicle-mounted terminal, assuming that a user in the audio zone 1 is waking up the audio zone 1 by inputting a voice wake-up signal over voice, and a user in the audio zone 3 is waking up the audio zone 3 by inputting a voice wake-up signal over voice. Due to an insufficient degree of audio isolation between audio zones, an audio input device in the audio zone 1, an audio input device in the audio zone 2, and an audio input device in the audio zone 3 all acquire the voice wake-up signal.

Assuming that the amplitude of the voice wake-up signal collected by the audio input device in the audio zone 1 is greater than the amplitude of the voice wake-up signal collected by the audio input device in the audio zone 3, and the amplitude of the voice wake-up signal collected by the audio input device in the audio zone 3 is greater than the amplitude of the voice wake-up signal collected by the audio input device in the audio zone 2, then the electronic device may compare whether the amplitude of the voice wake-up signal collected by the audio input device in the audio zone 1 is greater than or equal to the preset amplitude.

S202: adding an identifier of a first audio zone in which an audio input device corresponding to the maximum amplitude is located to the first set of to-be-woken-up audio zones.

With continued reference to the above example, if the amplitude of the voice wake-up signal collected by the audio input device in the audio zone 1 is greater than or equal to the preset amplitude, the vehicle-mounted terminal may add an identifier of the audio zone 1 to the first set of to-be-woken-up audio zones. At this point, the audio zone 1 is the first audio zone.

S203: updating, according to a degree of sound isolation between the first audio zone and each second audio zone of second audio zones, an amplitude of a voice wake-up signal collected by an audio input device in each second audio zone, where the second audio zone is an audio zone in the at least two audio zones other than the first audio zone.

Specifically, after determining that the first audio zone may be woken up by a user, the electronic device may further calculate, according to the amplitude of the voice wake-up signal collected by the audio input device in the first audio zone and a degree of sound isolation between the first audio zone and the second audio zone, an amplitude Q of a voice of a user in the first audio zone collected by the audio input device in the second audio zone when the user is producing a voice wake-up signal. Then, the electronic device may subtract Q from the amplitude of the voice wake-up signal collected by the audio input device in the second audio zone to eliminate influence of the voice of the user in the first audio zone on the second audio zone, and obtain an actual amplitude of the voice wake-up signal collected by the audio input device in the second audio zone.

For example, the electronic device may obtain, according to the following formula (1), an amplitude of a voice wake-up signal collected by an audio input device in each second audio zone:

$$W_j = W_j - W_i * (10^P/20) \tag{1}$$

$W_j$ represents an amplitude of a voice wake-up signal collected by an audio input device in a $j^{th}$ audio zone (i.e., the second audio zone), $W_i$ represents an amplitude of a voice wake-up signal collected by an audio input device in an $i^{th}$ audio zone (i.e., the first audio zone), and p represents a degree of sound isolation between the $i^{th}$ audio zone and the $j^{th}$ audio zone.

When the electronic device is in a scenario where a degree of sound isolation between a plurality of audio zones is less than or equal to a preset degree of isolation, voice wake-up signals collected by the audio input device in the first audio zone and the audio input device in the second audio zone may be a voice wake-up signal from a same user, or be mixed with a voice wake-up signal from a same user. Therefore, by way of the manner shown in this step, influence of the voice of the user in the first audio zone on the second audio zone may be eliminated.

With continued reference to the above example, a vehicle-mounted terminal device may eliminate influence of the voice of the user in the audio zone 1 on the audio zone 2 according to the degree of sound isolation between the audio zone 1 and the audio zone 2, and obtain an actual amplitude of the voice wake-up signal collected by the audio input device in the audio zone 2. The vehicle-mounted terminal device may eliminate influence of the voice of the user in the audio zone 1 on the audio zone 3 according to the degree of sound isolation between the audio zone 1 and the audio zone 3, and obtain an actual amplitude of the voice wake-up signal collected by the audio input device in the audio zone 3.

S204: determining, from updated amplitudes of voice wake-up signals collected by audio input devices in the second audio zones, whether there is an amplitude greater than or equal to the preset amplitude. If yes, S205 is performed, if no, this process is ended.

Whether there is still an audio zone being woken up is distinguished by determining, from the updated amplitudes of the voice wake-up signals collected by the audio input devices in the second audio zones, whether there is an amplitude greater than or equal to the preset amplitude.

S205: adding an identifier of a second audio zone in which an audio input device corresponding to the amplitude greater than or equal to the preset amplitude is located to the first set of to-be-woken-up audio zones.

With continued reference to the above example, in this example, a voice wake-up signal collected by the audio input device in the audio zone 3 has an amplitude greater than or equal to the preset amplitude, thus the electronic device may also add an identifier of the audio zone 3 to the first set of to-be-woken-up audio zones. That is, the first set of to-be-woken-up audio zones obtained by the electronic device from the amplitudes of the voice wake-up signals collected by the audio input devices in the audio zones includes the audio zone 1 and the audio zone 3.

According to the voice wake-up processing method provided in the present disclosure, after acquiring voice wake-up signals collected by audio input devices in at least two audio zones, the electronic device may accurately identify, based on amplitudes of the voice wake-up signals collected by the audio input devices in the at least two audio zones and degrees of isolation between an audio zone where an audio input device corresponding to the maximum amplitude is located and other audio zones, which audio zones are woken up by users, improving the accuracy of the electronic device identifying which audio zone being woken up by a user according to the amplitudes of the voice wake-up signals collected by the audio input devices in the audio zones.

It can be understood that although the voice wake-up processing method provided in the present disclosure has been described and introduced in the foregoing embodiments by using the electronic device as an executive subject, persons skilled in the art may understand that, during a specific implementation, the foregoing method embodiments may also be implemented by the foregoing electronic device using a voice interaction system or an application installed thereon, for which details will not be described herein again.

Figure 4:
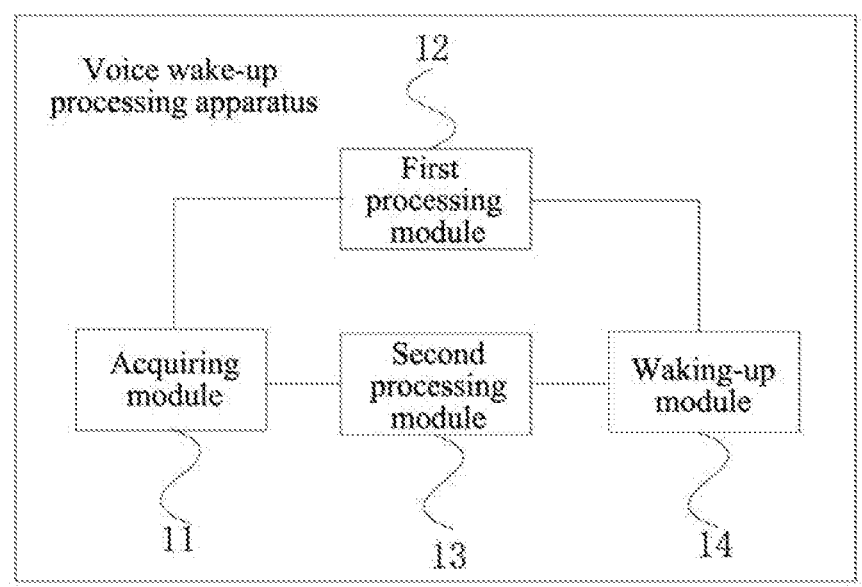
FIG. 4 is a schematic structural diagram of a voice wake-up processing apparatus according to the present disclosure.

FIG. 4 is a schematic structural diagram of a voice wake-up processing apparatus according to the present disclosure. As shown in FIG. 4, the voice wake-up processing apparatus can be applied to the aforementioned electronic device. For example, the voice wake-up processing apparatus may be a device chip applied to the forgoing electronic device.

As shown in FIG. 4, the apparatus includes: an acquiring module 11, a first processing module 12, a second processing module 13, and a waking-up module 14.

The acquiring module 11 is configured to acquire voice wake-up signals collected by audio input devices in at least two audio zones.

The first processing module 12 is configured to determine, according to amplitudes of the voice wake-up signals collected by the audio input devices in the at least two audio zones, a first set of to-be-woken-up audio zones, where a voice wake-up signal collected by an audio input device in an audio zone of the first set of to-be-woken-up audio zones has an amplitude greater than or equal to a preset amplitude.

The second processing module 13 is configured to determine, according to the voice wake-up signals collected by the audio input devices in the at least two audio zones, a second set of to-be-woken-up audio zones using a voice engine.

The waking-up module 14 is configured to use, when the first set of to-be-woken-up audio zones and the second set of to-be-woken-up audio zones have an identical audio zone, the identical audio zone as a woken-up audio zone of the electronic device.

Optionally, the waking-up module 14 is further configured to use, when the first set of to-be-woken-up audio zones and the second set of to-be-woken-up audio zones do not have an identical audio zone, an audio zone of the first set of to-be-woken-up audio zones as a woken-up audio zone of the electronic device.

Optionally, the acquiring module 11 is specifically configured to: acquire voice signals collected by the audio input devices in the at least two audio zones; and determine, according to a preset wake-up word, the voice signals collected by the audio input devices in the at least two audio zones as the voice wake-up signals.

Optionally, the electronic device is a vehicle-mounted terminal.

Optionally, one audio zone covers one seat of the vehicle.

Figure 5:
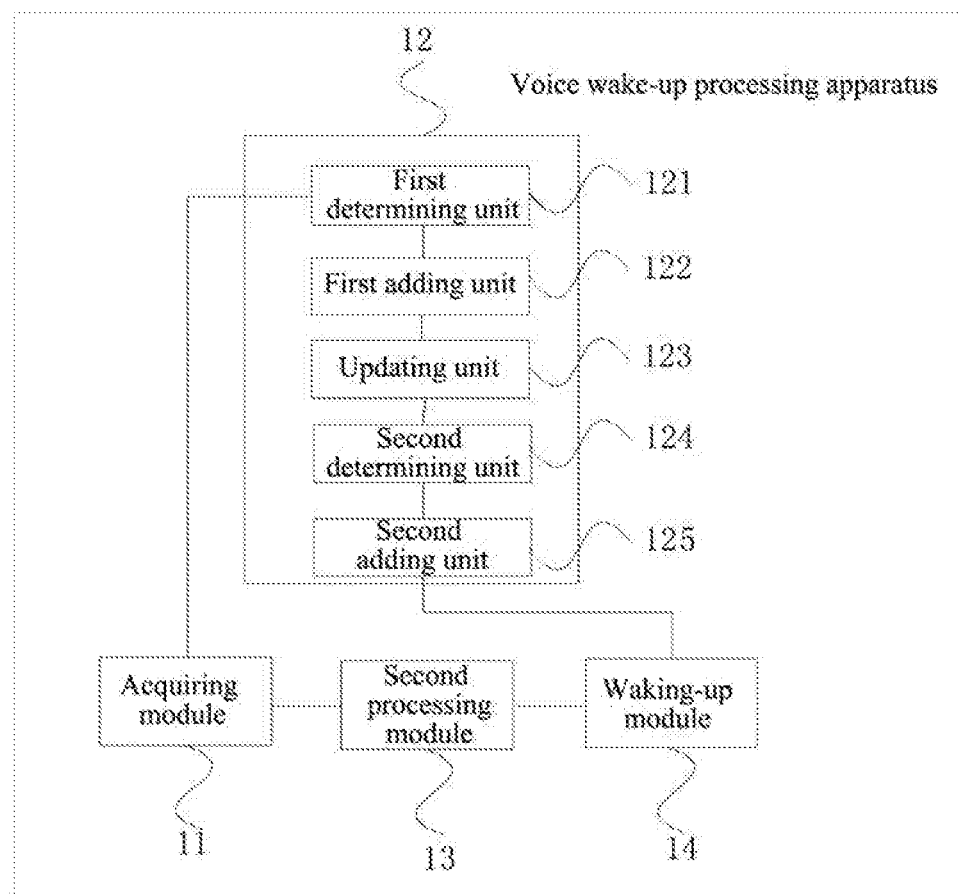
FIG. 5 is a schematic structural diagram of another voice wake-up processing apparatus according to the present disclosure.

FIG. 5 is a schematic structural diagram of another voice wake-up processing apparatus according to the present disclosure. As shown in FIG. 5, based on the block diagram shown in FIG. 4, the first processing module 12 described above may include:

a first determining unit 121, configured to determine whether a maximum amplitude from the amplitudes of the voice wake-up signals collected by the audio input devices in the at least two audio zones is greater than or equal to the preset amplitude;

a first adding unit 122, configured to add, when the maximum amplitude from the amplitudes of the voice wake-up signals collected by the audio input devices in the at least two audio zones is greater than or equal to the preset amplitude, an identifier of a first audio zone in which an audio input device corresponding to the maximum amplitude is located to the first set of to-be-woken-up audio zones;

an updating unit 123, configured to update, according to a degree of sound isolation between the first audio zone and each second audio zone of second audio zones, an amplitude of a voice wake-up signal collected by an audio input device in each second audio zone, where the second audio zone is an audio zone in the at least two audio zones other than the first audio zone;

a second determining unit 124, configured to determine, from updated amplitudes of voice wake-up signals collected by audio input devices in the second audio zones, whether there is an amplitude greater than or equal to the preset amplitude; and a second adding unit 125, configured to add, when there is an amplitude greater than or equal to the preset amplitude, from the updated amplitudes of the voice wake-up signals collected by the audio input devices in the second audio zones, an identifier of a second audio zone in which an audio input device corresponding to the amplitude greater than or equal to the preset amplitude is located to the first set of to-be-woken-up audio zones.

Figure 6:
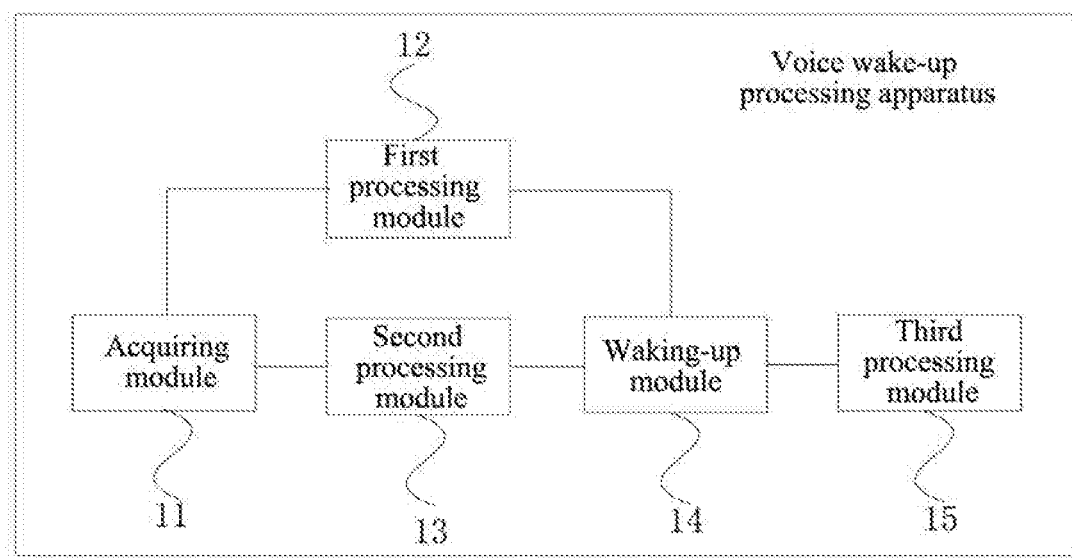
FIG. 6 is a schematic structural diagram of still another voice wake-up processing apparatus according to the present disclosure.

FIG. 6 is a schematic structural diagram of still another voice wake-up processing apparatus according to the present disclosure. As shown in FIG. 6, based on the block diagram shown in FIG. 4, the apparatus described above may further include:

a third processing module 15, configured to perform, after the waking-up module uses the identical audio zone as the woken-up audio zone of the electronic device, semantic identification and processing on a voice signal subsequently collected by an audio input device in the woken-up audio zone of the electronic device.

The voice wake-up processing apparatus provided in the present disclosure may perform actions of the electronic device in the foregoing method embodiments, and implementation principles and technical effects therebetween are similar, for which details will not be described herein again.

It should be noted that it will be appreciated that the above modules may be implemented in a form of software which is invoked by a processing element; or may be implemented in a form of hardware. For example, the acquiring module may be a separately arranged processing element, or may be integrated in a certain chip of the forgoing apparatus, or may be stored in a memory of the forgoing apparatus in a form of program codes and invoked by a certain processing element of the above apparatus and executes the functions of the foregoing processing unit. In addition, all or part of these units may be integrated together or implemented independently. The processing element described herein may be an integrated circuit with signal processing capabilities. During an implementation, each step of the forgoing method or each of the foregoing units may be completed by an integrated logic circuit of hardware in the processing element or by an instruction in a form of software.

For example, the above units may be one or more integrated circuits configured to implement the foregoing method, such as: one or more application specific integrated circuits (ASIC), or one or more microprocessors (digital signal processor, DSP), or one or more field programmable gate arrays (FPGA), or the like. For another example, when one of the above units is implemented in a form where a processing element schedules program codes, the processing element may be a general purpose processor, such as a central processing unit (CPU) or other processors that can invoke the program codes. For another example, these units may be integrated together and implemented in a form of a system-on-a-chip (SOC).

Figure 7:
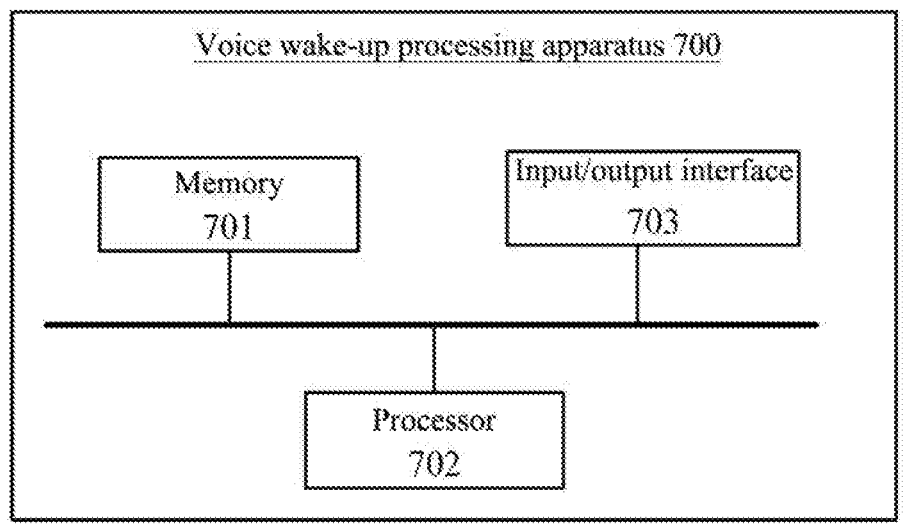
FIG. 7 is a schematic structural diagram of still another voice wake-up processing apparatus according to the present disclosure.

FIG. 7 is a schematic structural diagram of still another voice wake-up processing apparatus according to the present disclosure, where the voice wake-up processing apparatus may be, for example, an electronic device, such as a vehicle-mounted terminal, an intelligent home system or the like. As shown in FIG. 7, the voice wake-up processing apparatus 700 includes a memory 701 and at least one processor 702.

The memory 701 is configured to store a program instruction.

The processor 702 is configured to implement the voice wake-up processing method in the embodiments of the present disclosure when the program instruction is executed. For specific implementation principles, reference may be made to the foregoing embodiments, and details will not be described herein again.

The voice wake-up processing apparatus 700 may also include an input/output interface 703.

The input/output interface 703 may include an output interface and an input interface that are separately provided, or an integrated interface that is integrated with input and output. The output interface is configured to output data, and the input interface is configured to acquire input data, where the output data is a general term of output in the foregoing method embodiments, and the input data is a general term of input in the foregoing method embodiments.

The present disclosure also provides a readable storage medium having an execution instruction stored thereon. The voice wake-up processing method in the foregoing embodiments is implemented when at least one processor of the voice wake-up processing apparatus executes the execution instruction.

The present disclosure also provides a program product including an execution instruction stored in a readable storage medium. At least one processor of the voice wake-up processing apparatus may read the execution instruction from the readable storage medium, and the at least one processor executes the execution instruction such that the voice wake-up processing apparatus implements the voice wake-up processing method provided in various embodiments described above.

In several embodiments provided in the present disclosure, it will be appreciated that the disclosed apparatus and method may be implemented in other manners. For example, the described apparatus embodiments are merely exemplary. For example, the division of the units is merely a division of logical functions and there may be other divisions during actual implementations. For example, a plurality of units or components may be combined or integrated into another system, or some features may be omitted or not performed. In addition, the presented or discussed mutual couplings or direct couplings or communication connections may be indirect couplings or communication connections through some interface, apparatuses or units and may be implemented in electronic, mechanical, or other forms.

The units described as separate parts may or may not be physically separate, and parts shown as units may or may not be physical units, that is, may be located in one position, or may be distributed on a plurality of network units. A part or all of the units may be selected according to actual needs to achieve the objectives of the scheme in the embodiments of the present disclosure.

In addition, functional units in the embodiments of the present disclosure may be integrated into one processing unit, or each of the units may exist alone physically, or two or more units are integrated into one unit. The above integrated unit may be implemented in a form of hardware or in a form of hardware plus a software functional unit.

The integrated unit implemented in the form of a software functional unit as described above may be stored in a computer readable storage medium. The above software functional unit is stored in a storage medium, and includes several instructions for enabling a computer device (which may be a personal computer, a server, or a network device, etc.) or a processor to perform a part of steps of the method described in the embodiments of the present disclosure. The foregoing storage medium includes: any medium that can be stored with program codes, such as a USB flash disk, a mobile hard disk, a Read-Only Memory (ROM for short), a Random Access Memory (RAM for short), a magnetic disk, or an optical disc, etc.

In the foregoing embodiments, it will be appreciated that the foregoing processor may be a central processing unit (CPU for short), or may be other general purpose processor, digital signal processor (DSP for short), application specific integrated circuit (ASIC), or the like. The general purpose processor may be a microprocessor; alternatively, the processor may be any conventional processor or the like. The steps of the method disclosed in connection with the present disclosure may be directly embodied as being performed and implemented by a hardware processor or by a combination of hardware and software modules in the processor.

Finally, it should be noted that the foregoing embodiments are merely intended for describing the technical solutions of the present disclosure other than limiting the present disclosure. Although the present disclosure has been described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions of the embodiments of the present disclosure.

What is claimed is:

1. A voice wake-up processing method, wherein the method is applied to an electronic device, and the electronic device comprises an audio input device provided in each audio zone, and the method comprises:
    acquiring voice wake-up signals collected by audio input devices in at least two audio zones;
    determining, according to amplitudes of the voice wake-up signals collected by the audio input devices in the at least two audio zones, a first set of to-be-woken-up audio zones, wherein a voice wake-up signal collected by an audio input device in an audio zone of the first set of to-be-woken-up audio zones has an amplitude greater than or equal to a preset amplitude;
    determining, according to the voice wake-up signals collected by the audio input devices in the at least two audio zones, a second set of to-be-woken-up audio zones using a voice engine; and
    if the first set of to-be-woken-up audio zones and the second set of to-be-woken-up audio zones have an identical audio zone, using the identical audio zone as a woken-up audio zone of the electronic device.

2. The method according to claim 1, further comprising:
    if the first set of to-be-woken-up audio zones and the second set of to-be-woken-up audio zones do not have an identical audio zone, using an audio zone of the first set of to-be-woken-up audio zones as a woken-up audio zone of the electronic device.

3. The method according to claim 1, wherein the determining, according to amplitudes of the voice wake-up signals collected by the audio input devices in the at least two audio zones, a first set of to-be-woken-up audio zones comprises:
    determining whether a maximum amplitude from the amplitudes of the voice wake-up signals collected by the audio input devices in the at least two audio zones is greater than or equal to the preset amplitude;
    if the maximum amplitude is greater than or equal to the preset amplitude, adding an identifier of a first audio zone in which an audio input device corresponding to the maximum amplitude is located to the first set of to-be-woken-up audio zones;
    updating, according to a degree of sound isolation between the first audio zone and each second audio zone of second audio zones, an amplitude of a voice wake-up signal collected by an audio input device in each second audio zone, wherein the second audio zone is an audio zone in the at least two audio zones other than the first audio zone;
    determining, from updated amplitudes of voice wake-up signals collected by audio input devices in the second audio zones, whether there is an amplitude greater than or equal to the preset amplitude; and
    if from the updated amplitudes of the voice wake-up signals collected by the audio input devices in the second audio zones there is an amplitude greater than or equal to the preset amplitude, adding an identifier of a second audio zone in which an audio input device corresponding to the amplitude greater than or equal to the preset amplitude is located to the first set of to-be-woken-up audio zones.

4. The method according to claim 1, wherein the acquiring voice wake-up signals collected by audio input devices in at least two audio zones comprises:
    acquiring voice signals collected by the audio input devices in the at least two audio zones; and
    determining, according to a preset wake-up word, the voice signals collected by the audio input devices in the at least two audio zones as the voice wake-up signals.

5. The method according to claim 1, wherein after the using the identical audio zone as a woken-up audio zone of the electronic device, the method further comprises:
    performing semantic identification and processing on a voice signal subsequently collected by an audio input device in the woken-up audio zone of the electronic device.

6. The method according to claim 1, wherein the electronic device is a vehicle-mounted terminal.

7. The method according to claim 6, wherein one audio zone covers one seat of the vehicle.

8. The method according to claim 1, wherein a value of the preset amplitude is determined according to a maximum amplitude among voice wake-up signals that are collected by audio input devices in all audio zones.

9. The method according to claim 8, wherein the preset amplitude is equal to or slightly smaller than the maximum amplitude among the voice wake-up signals that are collected by the audio input devices in all the audio zones.

10. The method according to claim 3, wherein the identifier of the first audio zone is an index number of the first audio zone or location information of the first audio zone, and the identifier of the second audio zone is an index number of the second audio zone or location information of the second audio zone.

11. The method according to claim 3, wherein the updating, according to a degree of sound isolation between the first audio zone and each second audio zone of second audio zones, an amplitude of a voice wake-up signal collected by an audio input device in each second audio zone comprises:
   calculating, according to an amplitude of a voice wake-up signal collected by an audio input device in the first audio zone and a degree of sound isolation between the first audio zone and the second audio zone, an amplitude Q of a voice of a user in the first audio zone collected by an audio input device in the second audio zone when the user is producing the voice wake-up signal;
   obtain an actual amplitude of a voice wake-up signal collected by the audio input device in the second audio zone, by subtracting the amplitude Q from the amplitude of the voice wake-up signal collected by the audio input device in the second audio zone.

12. A voice wake-up processing apparatus, wherein the apparatus is applied to an electronic device, the electronic device comprises an audio input device provided in each audio zone, and the apparatus comprises: at least one processor, and a memory for storing a program instruction which, when executed by the at least one processor, cause the at least one processor to:
   acquire voice wake-up signals collected by audio input devices in at least two audio zones;
   determine, according to amplitudes of the voice wake-up signals collected by the audio input devices in the at least two audio zones, a first set of to-be-woken-up audio zones, wherein a voice wake-up signal collected by an audio input device in an audio zone of the first set of to-be-woken-up audio zones has an amplitude greater than or equal to a preset amplitude;
   determine, according to the voice wake-up signals collected by the audio input devices in the at least two audio zones, a second set of to-be-woken-up audio zones using a voice engine; and
   use, when the first set of to-be-woken-up audio zones and the second set of to-be-woken-up audio zones have an identical audio zone, the identical audio zone as a woken-up audio zone of the electronic device.

13. The voice wake-up processing apparatus according to claim 12, the program instruction further causes the at least one processor to:
   if the first set of to-be-woken-up audio zones and the second set of to-be-woken-up audio zones do not have an identical audio zone, use an audio zone of the first set of to-be-woken-up audio zones as a woken-up audio zone of the electronic device.

14. The voice wake-up processing apparatus according to claim 12, wherein when the program instruction causes the at least one processor to determine, according to amplitudes of the voice wake-up signals collected by the audio input devices in the at least two audio zones, a first set of to-be-woken-up audio zones, the program instruction specifically causes the at least one processor to:
   determine whether a maximum amplitude from the amplitudes of the voice wake-up signals collected by the audio input devices in the at least two audio zones is greater than or equal to the preset amplitude;
   if the maximum amplitude is greater than or equal to the preset amplitude, add an identifier of a first audio zone in which an audio input device corresponding to the maximum amplitude is located to the first set of to-be-woken-up audio zones;
   update, according to a degree of sound isolation between the first audio zone and each second audio zone of second audio zones, an amplitude of a voice wake-up signal collected by an audio input device in each second audio zone, wherein the second audio zone is an audio zone in the at least two audio zones other than the first audio zone;
   determine, from updated amplitudes of voice wake-up signals collected by audio input devices in the second audio zones, whether there is an amplitude greater than or equal to the preset amplitude; and
   if from the updated amplitudes of the voice wake-up signals collected by the audio input devices in the second audio zones there is an amplitude greater than or equal to the preset amplitude, add an identifier of a second audio zone in which an audio input device corresponding to the amplitude greater than or equal to the preset amplitude is located to the first set of to-be-woken-up audio zones.

15. The voice wake-up processing apparatus according to claim 14, wherein when the program instruction causes the at least one processor to update, according to a degree of sound isolation between the first audio zone and each second audio zone of second audio zones, an amplitude of a voice wake-up signal collected by an audio input device in each second audio zone, the program instruction specifically causes the at least one processor to:
   calculate, according to an amplitude of a voice wake-up signal collected by an audio input device in the first audio zone and a degree of sound isolation between the first audio zone and the second audio zone, an amplitude Q of a voice of a user in the first audio zone collected by an audio input device in the second audio zone when the user is producing the voice wake-up signal;
   obtain an actual amplitude of a voice wake-up signal collected by the audio input device in the second audio zone, by subtracting the amplitude Q from the amplitude of the voice wake-up signal collected by the audio input device in the second audio zone.

16. The voice wake-up processing apparatus according to claim 12, wherein when the program instruction causes the at least one processor to acquire voice wake-up signals collected by audio input devices in at least two audio zones, the program instruction specifically causes the at least one processor to:
   acquire voice signals collected by the audio input devices in the at least two audio zones; and
   determine, according to a preset wake-up word, the voice signals collected by the audio input devices in the at least two audio zones as the voice wake-up signals.

17. The voice wake-up processing apparatus according to claim 12, after the program instruction causes the at least one processor to use the identical audio zone as a woken-up audio zone of the electronic device, the program instruction further causes the at least one processor to:
   perform semantic identification and process on a voice signal subsequently collected by an audio input device in the woken-up audio zone of the electronic device.

18. The voice wake-up processing apparatus according to claim 12, wherein the electronic device is a vehicle-mounted terminal.

19. The voice wake-up processing apparatus according to claim 18, wherein one audio zone covers one seat of the vehicle.

20. A non-transitory computer readable storage medium having a computer executable instruction stored thereon, wherein the computer executable instruction implements the method according to claim 1 when executed by a processor.

* * * * *